United States Patent
Babuder et al.

(10) Patent No.: US 6,234,545 B1
(45) Date of Patent: *May 22, 2001

(54) CLAMPED FLANGE FITTING AND ASSEMBLY

(75) Inventors: Gerald A. Babuder, Mentor; Ronald K. Fisher, Jr., Rootstown, both of OH (US)

(73) Assignee: Swagelok Company, Solon, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/049,407

(22) Filed: Mar. 27, 1998

Related U.S. Application Data

(63) Continuation of application No. 08/893,974, filed on Jul. 16, 1998, now abandoned, and a continuation of application No. 08/634,462, filed on Apr. 18, 1996, now Pat. No. 5,893,915, and a continuation of application No. 08/129,735, filed on Sep. 29, 1993, now abandoned, and a continuation-in-part of application No. 07/938,752, filed on Sep. 1, 1992, now abandoned.

(51) Int. Cl.⁷ ..................................................... F16J 15/10
(52) U.S. Cl. .......................... 285/364; 285/336; 285/363; 285/365; 277/608; 277/611; 277/614
(58) Field of Search .................... 285/409, 410, 285/411, 363–367, 349, 350, 336; 277/614, 626, 644, 611, 651, 627, 652, 654; 24/285, 279

(56) References Cited

U.S. PATENT DOCUMENTS

| | | |
|---|---|---|
| Re. 34,144 | 12/1992 | Leigh . |
| 144,997 | 11/1873 | Mayall . |
| 442,947 | 12/1890 | Bowers . |
| 1,137,113 | 4/1915 | Boulchard . |
| 1,572,781 | 2/1926 | Farmer . |
| 1,873,855 | 8/1932 | Wilson . |
| 2,070,291 | 2/1937 | McHugh . |
| 2,178,819 | 11/1939 | Timm . |
| 2,291,709 | 8/1942 | Goetze . |
| 2,342,422 | 2/1944 | Morehead et al. . |
| 2,417,025 | 3/1947 | Volpin . |
| 2,552,750 | 5/1951 | Thornhill . |
| 2,780,483 | 2/1957 | Kessler . |
| 2,789,844 | 4/1957 | Kessler . |
| 3,042,430 | 7/1962 | Guy . |
| 3,078,110 | 2/1963 | Starr . |
| 3,100,656 | 8/1963 | MacArthur . |
| 3,180,650 | 4/1965 | Liebig . |

(List continued on next page.)

FOREIGN PATENT DOCUMENTS

| | | |
|---|---|---|
| 707239 | 4/1965 | (CA) . |
| 674764 | 7/1990 | (CH) . |
| 8800117 U | 4/1988 | (DE) . |
| 3741782 | 6/1989 | (DE) . |
| 3805885 | 9/1989 | (DE) . |
| 4140814 | 6/1993 | (DE) . |
| 4201535 | 7/1993 | (DE) . |
| 195868A1 | 12/1985 | (EP) . |
| 278586A1 | 1/1988 | (EP) . |
| 0327714A3 | 8/1989 | (EP) . |
| 638761 | 10/1947 | (GB) . |
| 798650 | 7/1958 | (GB) . |

*Primary Examiner*—Anthony Knight
(74) *Attorney, Agent, or Firm*—Calfee, Halter & Griswold

(57) ABSTRACT

A clamped flange pipe or tube fitting assembly includes a resilient seal ring compressed in a chamber formed by cooperating recesses in opposed flanges. The chamber and seal ring are dimensionally related in a manner to produce circumferentially continuous, radially spaced primary and secondary seal areas and to assure a continuous interior surface between the connected pipes or tubes with no recesses to entrap process fluids.

27 Claims, 5 Drawing Sheets

U.S. PATENT DOCUMENTS

| | | |
|---|---|---|
| 3,189,371 | 6/1965 | Swan . |
| 3,195,906 | 7/1965 | Moyers . |
| 3,201,725 | 8/1965 | Johnson . |
| 3,215,442 | 11/1965 | Papenguth . |
| 3,298,719 | 1/1967 | Bills et al. . |
| 3,302,953 | 2/1967 | Glasgow . |
| 3,387,867 | 6/1968 | Rogers . |
| 3,484,912 | 12/1969 | Crain . |
| 3,600,770 | 8/1971 | Halling . |
| 3,618,989 * | 11/1971 | Ito ............................................ 285/336 |
| 3,635,480 * | 1/1972 | Bain et al. ............................ 277/651 |
| 3,669,474 | 6/1972 | Bode . |
| 3,705,737 | 12/1972 | Westerlund et al. . |
| 3,727,926 | 4/1973 | Berry . |
| 3,747,963 | 7/1973 | Shivak . |
| 3,775,832 | 12/1973 | Werra . |
| 3,797,079 | 3/1974 | Nixon . |
| 3,819,211 | 6/1974 | Knox . |
| 3,820,830 | 6/1974 | Dryer . |
| 3,854,736 * | 12/1974 | Farnam ............................... 277/652 X |
| 3,873,102 | 3/1975 | Lotze et al. . |
| 3,966,240 | 6/1976 | Enomoto . |
| 3,989,285 | 11/1976 | Yancey . |
| 4,094,520 * | 6/1978 | Ng et al. ............................. 285/363 X |
| 4,123,095 | 10/1978 | Stehlin . |
| 4,341,406 * | 7/1982 | Abbes et al. ........................ 24/279 X |
| 4,345,739 * | 8/1982 | Wheatly ............................. 277/651 X |
| 4,362,327 | 12/1982 | Mieth . |
| 4,362,449 * | 12/1982 | Hlinsky ................................. 411/156 |
| 4,368,894 * | 1/1983 | Parmann ............................ 277/627 X |
| 4,410,186 * | 10/1983 | Pierce ................................. 277/626 X |
| 4,429,847 * | 2/1984 | Jablonski et al. .................... 24/279 X |
| 4,568,115 | 2/1986 | Zimmerly . |
| 4,627,646 | 12/1986 | Kessel . |
| 4,653,725 | 3/1987 | Nanz et al. . |
| 4,735,445 | 4/1988 | Maier . |
| 4,739,542 | 4/1988 | Krzasicki . |
| 4,779,903 | 10/1988 | Maier et al. . |
| 4,812,285 | 3/1989 | Stapleton . |
| 4,836,583 | 6/1989 | Maier et al. . |
| 4,872,712 | 10/1989 | Maier . |
| 4,915,418 | 4/1990 | Palatchy . |
| 4,919,453 | 4/1990 | Halling et al. . |
| 5,076,617 | 12/1991 | Bronnert . |
| 5,090,871 | 2/1992 | Story et al. . |
| 5,196,814 | 3/1993 | Felker et al. . |
| 5,222,747 | 6/1993 | McGarvey . |
| 5,251,941 | 10/1993 | McGarvey . |
| 5,316,320 * | 5/1994 | Breaker ................................. 277/611 |
| 5,433,454 | 7/1995 | Ramberg . |
| 5,505,464 | 4/1996 | McGarvey . |
| 5,566,983 | 10/1996 | Gluys et al. . |

* cited by examiner

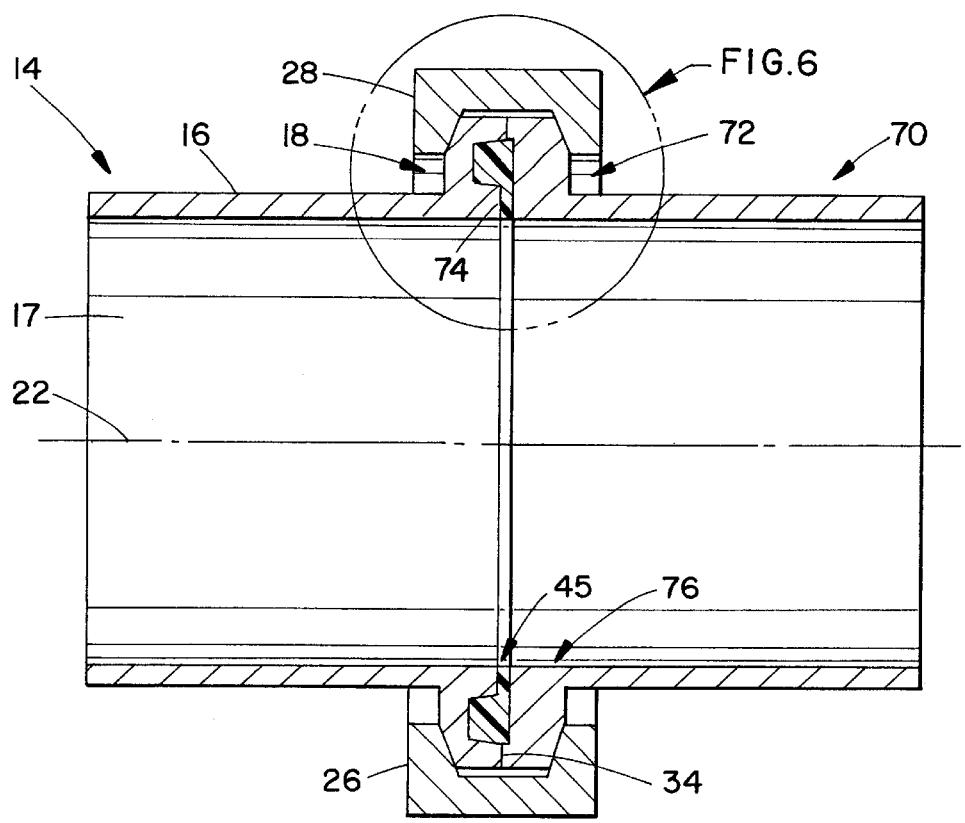
FIG. 5
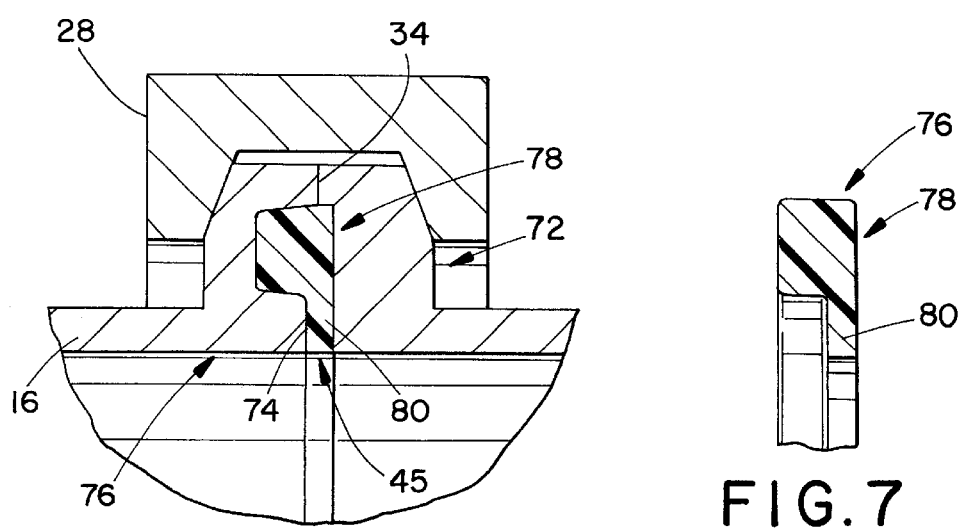
FIG. 6
FIG. 7

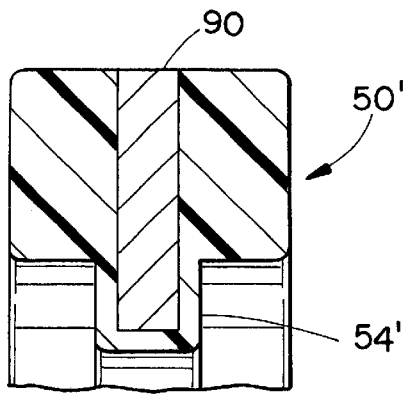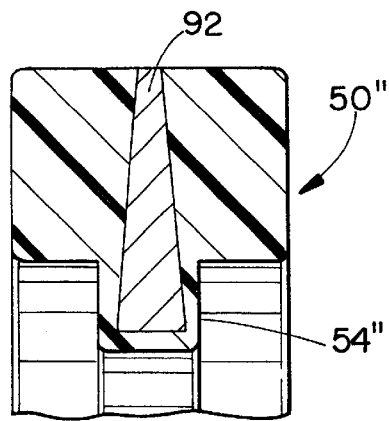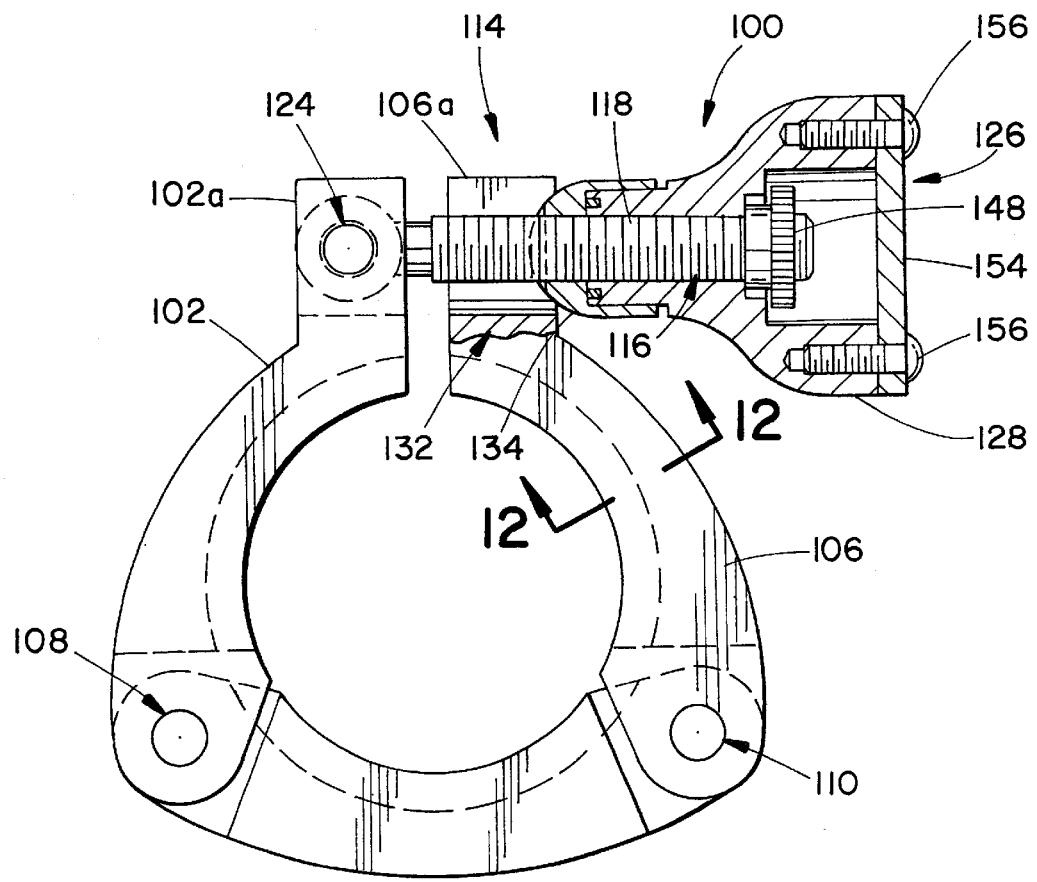

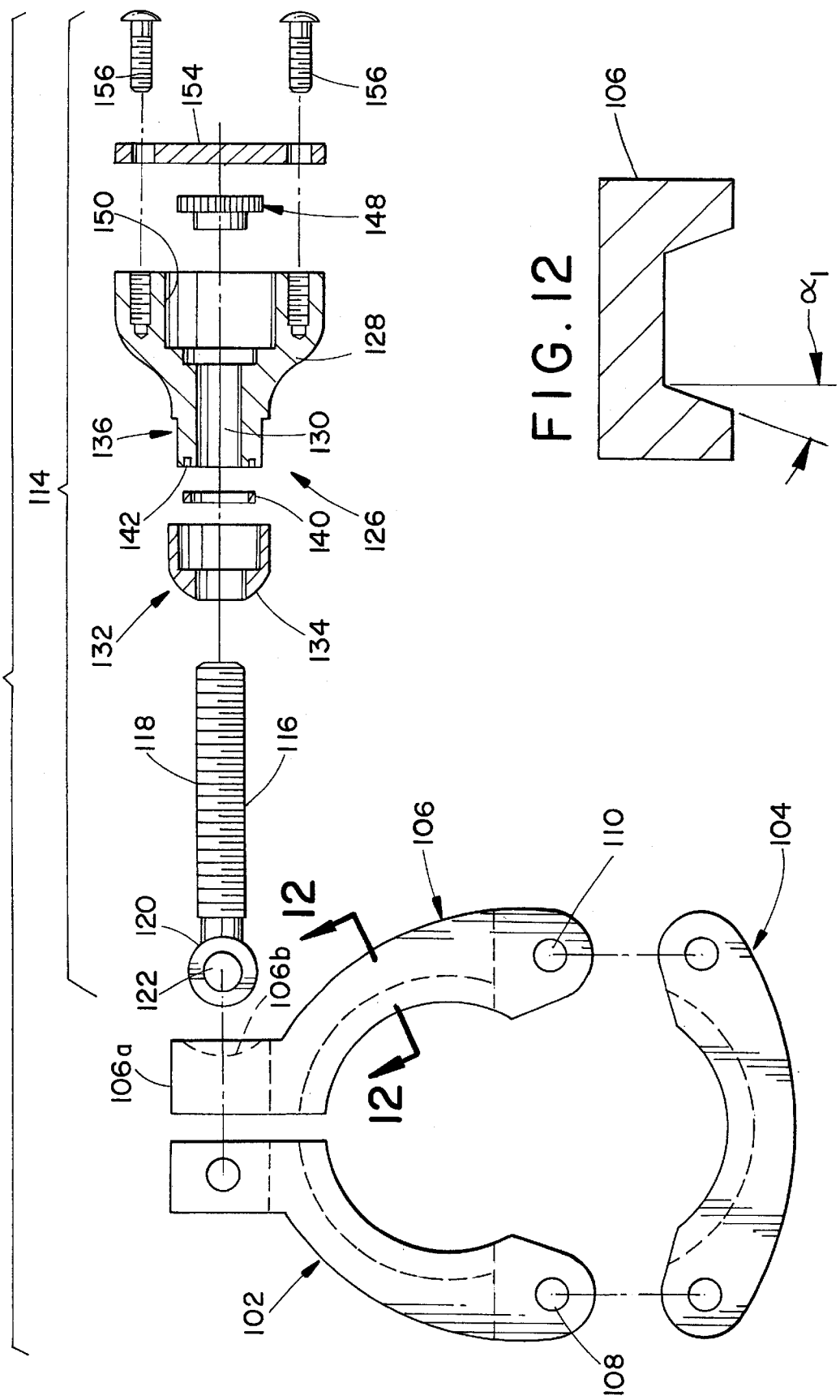

CLAMPED FLANGE FITTING AND ASSEMBLY

This application is a continuation of application Ser. No. 08/893,974 filed Jul. 16, 1998, now abandoned; a continuation of application Ser. No. 08/634,462 filed Apr. 18, 1996, now U.S. Pat. No. 5,893,915; a continuation of application Ser. No. 08/129,735 filed Sep. 29, 1993, now abandoned; and a continuation in part of application Ser. No. 07/938,752 filed on Sep. 1, 1992, now abandoned.

BACKGROUND OF THE INVENTION

The subject invention is directed toward the art of pipe and tube joints and couplings and, more particularly, to an improved flange type joint.

The invention is especially suited for forming connecting joints in critical processing systems where fluid entrapment or retention within the system must be avoided. In such systems, it is often difficult to eliminate recesses or pockets that retain process fluid between system runs or when switching fluids in a common line.

The problem of recesses and fluid trapping pockets is especially prevalent with respect to connecting joints which rely on resilient, elastomeric seals and packings. The typical prior packed joint was often difficult to assemble and frequently resulted in undesired discontinuities between the connected sections. Consequently, the need has existed for a joint construction which is easy to assemble and which does not produce pockets, recesses, or undesirable discontinuities which can trap process fluids.

In packed joints of the type under consideration, the components must generally be axially driven together under relatively high force to produce the necessary sealing pressures. Also, the joints are typically used in systems where frequent disassembly for cleaning, maintenance, and/or system changeover.

To meet the high force and rapid disassembly requirements, it has been the practice to use circumferentially extending, multi-section clamping rings. The rings sections have internal wedge surfaces that act against corresponding wedge surfaces on the exterior of the joint to drive the joint components axially together. Actuation of the clamp ring is generally accomplished by a thumb screw which pulls the sections together.

While generally satisfactory, problems have been encountered with the clamp rings. For example, in systems subject to substantial vibration, loosening of the clamp ring and loss of sealing force has occurred. Additionally, the repeated high force tightening and releasing of the thumb screws has produced significant galling and erosion of the nose of the thumb screws and/or the engaged portion of the clamp rings. This makes it difficult to retighten the clamps and also generates metal particles which are often highly undesirable in the system environment.

SUMMARY OF THE INVENTION

The subject invention provides a highly effective flange type, packed connection joint which eliminates entrapment areas. The joint of the invention provides a primary seal area closely adjacent the fluid flow path and a secondary seal area radially and axially spaced from the primary seal area.

The subject invention also provides a joint clamping system and arrangement wherein the above-discussed problems are overcome and high joint clamping forces are generated. The arrangement is such that assembly and disassembly of the joint can be performed rapidly and repeatedly without loss of effectiveness.

In accordance with one aspect of the invention, there is provided a flange connection for joining the ends of a pair of cylindrical pipes in axially aligned communicating relationship. The connection includes a separate flange member joined to the end of each pipe. Each flange member has a radially extending end face which is generally perpendicular to the axis of the pipe. A central circular opening extends through each end face in communication with the interior of the respective pipe. Means are provided for clamping the flanges together in axial alignment. In this invention, the feature of primary importance comprises a seal chamber formed by duplicate axially inward extending annular recesses formed in each flange circumferentially about the central opening with a circumferentially continuous engagement face located radially outward of each recess in a plane perpendicular to the central axis of the pipes. The recesses have axially open outer ends in opposed mating relationship and radially spaced planar side walls which are inclined toward one another to bottom walls which lie in planes perpendicular to the axis of the pipes. A narrow circumferentially continuous groove opens radially inward from the seal chamber to the central circular opening in alignment with the plane of the engagement faces. The groove is defined by axially spaced planar side walls. A resilient seal ring is compressed in the seal chamber with a narrow portion compressed between the planar side walls which define the narrow groove. The radial innermost extent of the narrow portion forms a smooth transition surface between the circular openings in the flanges. The size of the seal ring is such that when the engagement faces are clamped together, a primary seal pressure on the seal ring is generated by the planar side walls of the groove. A secondary seal pressure is generated on the seal ring by the planar bottom walls of the mating recesses.

Preferably, the dimensional relationships between the seal ring and the flange recesses are such that when the seal ring is placed in position on one of the flanges, there is a dimensional interference between the seal ring and the radial inner inclined side wall. The dimensional interference is sufficient to retain the seal ring in position while the other flange face is brought into position. This greatly facilitates assembly of the joint, especially in vertical positions.

The engagement between the seal ring and the radial inner inclined side wall provides alignment of the seal ring with the central circular opening prior to assembly with the opposing flange. In addition, when the opposing flange comes into engagement, the radial inner inclined side wall provides alignment of both flanges with each other and the central circular opening even prior to compression of the seal ring.

Ideally, the dimensional interference between the inner inclined side wall and the seal ring is sufficient to secure the assembly as a unit even prior to the installation or tightening of the associated clamping means.

In accordance a more limited aspect of the invention, the axially spaced planar side walls of the narrow groove can be parallel and perpendicular to the axis of the pipe or they can be inclined to produce a narrowing of the groove inwardly toward the axis of the pipe.

In accordance with a still further aspect of the invention, the seal ring is sized so as to substantially completely fill the seal chamber and the narrow groove upon assembly.

In accordance with a further aspect of the invention, the dimensional relationships between the seal ring and the groove are such that on make-up of the joint, the ring engages the planar bottom walls of the mating recesses prior to engagement by the planar side walls of the groove. Additionally, the relative dimensions are maintained such that the first primary sealing pressure is generated between the planar side walls of the groove and the seal to a relatively high level while a higher backup sealing pressure is generated on the seal ring by the planar bottom walls of the recesses.

In accordance with another aspect of the invention, an improved clamp ring assembly is provided for clamping adjacent pipes having flanged in longitudinal aligned relationship. The assembly generally includes a clamp ring having a flexible body section terminating in free ends and including a groove extending between the free ends along a side of the body section to engage the flanged ends and pull them axially together when the body section is encircled about the flanged ends and the free ends are forced toward one another. Locking means are provided to selectively force the free ends toward one another when the body section is encircled about the flanged ends. The locking means generally comprise a threaded clamp screw having opposite ends with one end connected with one of the free ends of the body section and the other end threadedly carrying a wing nut. The wing nut comprises a nut body having a nose portion engageable with the other free end of the body section for applying force thereto. The nose portion is pivotal relative to the nut body and a friction reducing, resilient washer is carried between the nose portion and the nut body. Sleeve means are carried by the nose portion for enclosing the resilient washer.

Preferably, and in accordance with a more limited aspect, the nut body includes a portion which extends into the sleeve into engagement with the washer to thereby totally enclose the washer. It is also preferable that the nut body include a central recess which is located about a lock nut carried on the threaded clamp screw for locking the nut body in a desired position of adjustment on the clamp screw.

The combination of the rotatable nose portion with the enclosed intermediate friction reducing washer prevents galling between the nut member and the clamp body portions. Also, tightening and loosening of the clamp assembly is greatly facilitated. The relationship of the lock nut to the clamp nut or wing nut greatly facilitates its use and assures that the clamp ring will not open and release the necessary axial loading on the gasket assembly.

As can be seen from the foregoing, a primary object of the invention is the provision of a packed flange type joint wherein sealing takes place closely about the interior of the pipe in a manner which eliminates recesses or pockets in which processed fluid might be entrained.

A still further object is the provision of a joint of the type described wherein sealing is accomplished on two radially and axially spaced areas which extend completely circumferentially of the joint.

Another object is the provision of a clamped flange joint wherein metal-to-metal contact of outer portions of the flange faces after proper make-up prevents over extruding of the seal and prevents loosening during vibration or temperature cycling. In addition, the metal-to-metal contact keeps the generated seal pressure from relaxing if the fitting is subjected to a radial or side load.

A still further object is the provision of a flange type clamped joint wherein the clamp ring assembly is provided with means which facilitate its use and prevents galling of the cooperating clamp elements.

Yet another object is the provision of a clamped flange assembly of the type described wherein the clamp ring assembly is designed so that manual tightening and release of the clamp ring is facilitated.

Yet another object is the provision of a connection of the type described which is relatively simple in construction and which can be quickly assembled and disassembled.

BRIEF DESCRIPTION OF THE DRAWINGS

The above and other objects and advantages will become apparent from the following description when read in conjunction with the accompanying drawings wherein:

FIG. 5 is a partial cross-sectional view similar to FIG. 1 but showing a modified form of the invention;

FIG. 6 is a greatly enlarged showing of the circled area of FIG. 5;

FIG. 7 is an enlarged cross-sectional view through the seal ring used in the FIG. 5 embodiment;

FIGS. 8 and 9 are views like FIG. 3 but showing alternate forms of seal rings;

FIG. 10 is a side elevational view of the clamp ring assembly used with the clamped flange joint of FIGS. 1 through 9;

FIG. 11 is an exploded view partially in cross section of the clamp ring assembly of FIG. 10; and, FIG. 12 is a cross-sectional view taken on line 12—12 of FIG. 11.

DETAILED DESCRIPTION OF THE PREFERRED AND ALTERNATE EMBODIMENTS

Figure 1:
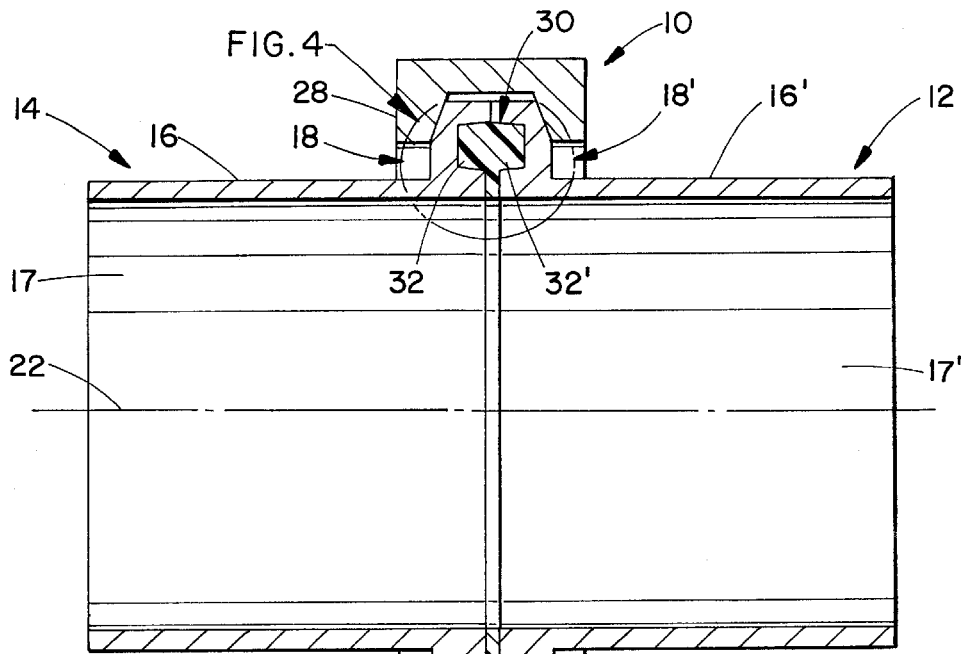
FIG. 1 is a longitudinal cross-sectional view through a flange type joint connection formed in accordance with the preferred embodiment of the invention.

Referring more particularly to the drawings wherein the showings are the purpose of illustrating preferred embodiments of the invention only, and not for the purpose of limiting same, FIG. 1 shows the overall arrangement of a flange type joint 10 between a pair of tube or pipe section elements 12 and 14. As will become apparent from the discussion which follows, the joint structure 10 can be formed by elements and components formed directly on the ends of pipes, or it can be formed by separate cylindrical sleeve sections with integral flanges which are subsequently welded to the ends of the pipe, or similar arrangements utilizing separate flange elements joined to the pipes. In the FIG. 1 embodiment, each of the sections 12, 14 are identical and only the section 14 will be described in detail. However, section 12 has been provided with duplicate reference numerals differentiated by a prime suffix ('). A description of the corresponding component or part of section 14 is to be taken as equally applicable to the section 12 element.

Figure 2:
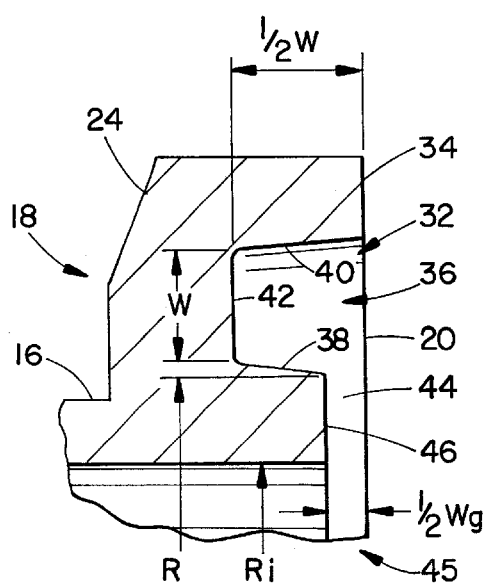
FIG. 2 is a greatly enlarged view of the cross-section of the flange and its associated recess.
Figure 4:
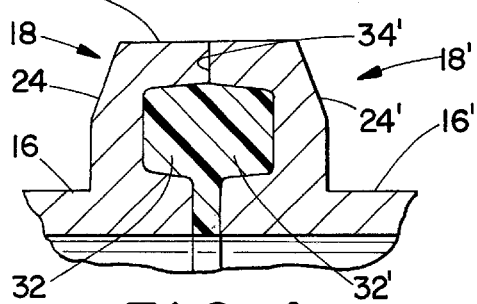
FIG. 4 is an enlarged view of the circled area of FIG. 1 with the clamp ring removed.
Figure 4A:
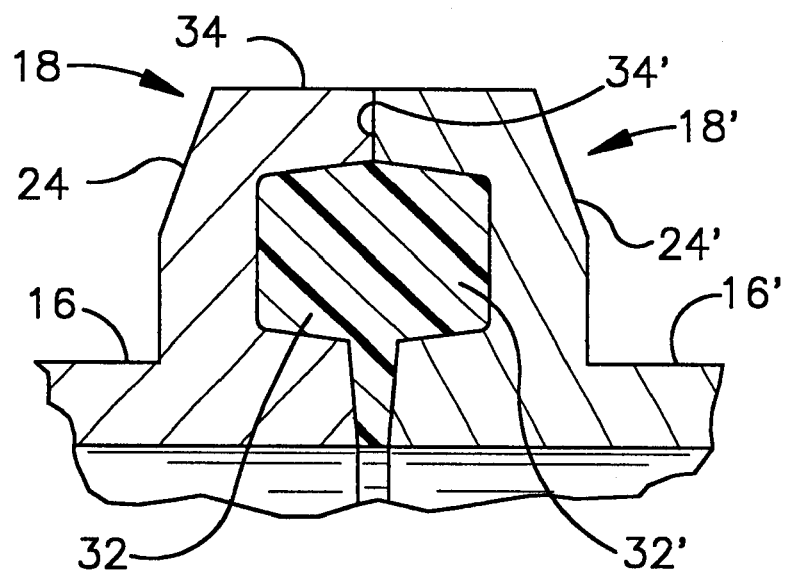

As shown, the section 14 comprises a cylindrical, tube-like main body 16 having a central circular opening 17 extending therethrough. The body 16 is suitably formed from a metal, such as stainless steel, and has an integral, radially extending flange 18 positioned about the right-hand end thereof. As best shown in FIGS. 2 and 4, the flange 18 is integral with, and extends radially from, the cylindrical main body 16. The flange 18 terminates in an end face 20 which extends perpendicular to the central axis 22 of the main body 16. On the side opposite the end face 20, there is a circumferentially continuous inclined, conically-shaped surface 24. In the subject embodiment, surface 24 provides a clamping surface for joining the flanges 18 and 18' together to axially align and join the sections 12, 14. Specifically, the flanges have a shape and are arranged to receive a conventional multiple component pipe clamp ring of conventional form such as is shown and described, for example, in U.S. Pat. No. 4,568,115. Other types and styles of mechanical connecting or clamping means could equally well be used to bring the flanged sections into mating aligned relationship.

In the FIG. 1 showing, the pipe clamp elements 26 and 28 include inwardly extending grooves provided with inclined surfaces adapted to engage with the exterior surfaces 24 on the flanges 18 and 18' to produce axial forces to drive the flanges together. The functioning and use of such clamp rings is well known and further description and discussion seems unnecessary. Of special importance to the subject invention is the arrangement of the seal chambers formed in the flange members 18 and 18'. As is shown, the seal chamber 30 in this embodiment is formed by duplicate axially inward extending annular recesses 32 and 32' formed in each flange circumferentially about the central openings 17 and 17', respectively. Lying outwardly in a radial direction from the recesses 32 and 32' are planar engagement faces 34 and 34' which lie in a plane perpendicular to the central axis 22. The engagement faces 34 and 34' meet in opposed metal-to-metal engaged relationship when the pipes sections are in their aligned and engaged relationship as shown in FIG. 1. As seen in FIG. 2, recess 32 has an axially open outer end 36 and radially spaced inner and outer side walls 38 and 40, respectively. The walls 38 and 40 are circumferentially continuous and are inclined and extend inwardly to a bottom wall 42 which is also circumferentially continuous. In the embodiment under consideration, the bottom wall 42 lies perpendicular to the central axis 22 and, of course, parallel to the end face 20. The flange 18 also includes a recess portion 44 which extends inwardly from the end face 20 circumferentially about the interior of the recess 32. The recess 44 terminates in a bottom wall 46 which is shown as being perpendicular to the axis 22 and parallel to the end face 20.

Referring again to FIG. 1, it will be noted that when the flanges 18 and 18' are clamped into position, the recess portions 44 and 44' together act to define a continuous narrow groove 45 opening radially inward from the seal chamber to the central circular opening 17, 17'. In the preferred embodiment, the walls 46 and 46' define axially spaced planar, parallel side walls for the groove 45.

Under certain conditions, however, it is contemplated that walls 46 and 46' can be inclined a few degrees up to perhaps as much as ten degrees (10°) such that the groove 45 narrows radially inward toward the axis 22. This can produce an increased sealing pressure closely adjacent the bore line of passages 17, 17'.

Compressed within the seal chamber 30 and the narrow radially inward open groove 45 is a seal ring member 50. The seal ring member 50 is arranged to substantially completely fill the seal chamber and the narrow groove opening to the central circular opening. Many different types of materials could be used for forming the seal ring depending upon the particular type of fluid material to be handled by the individual tube or pipe system in which the joint assembly is to be installed. However, typical materials from which the seal ring has been formed are resilient, elastomeric material such as ethylene propylene and silicone rubbers.

Figure 3:
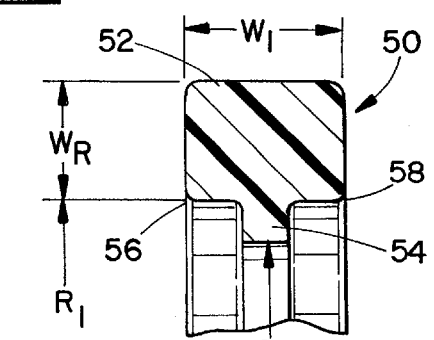
FIG. 3 is a cross-sectional view of the seal ring in its normal uncompressed, unassembled condition.

FIGS. 3 and 2 best show the overall design of the seal ring and its relationship to the flange face recesses. As shown in FIG. 3, the seal ring member 50 has a main body 52 with a generally rectangular cross-section. A somewhat smaller portion 54 also of rectangular cross-section extends radially inward from the main body 52 as illustrated.

The main body 52 is related to the dimensions of the recesses 32, 32' so as to achieve the desired sealing relationships. Specifically, as generally noted in FIGS. 2 and 3, the radius $R_1$ of the seal ring 50 is substantially equal to radius R of the flange recess 32. Thus, when the seal ring 50 is moved into position relative to the recesses 32, there is an interference fit between the inner corner 56 of the main body 52 and the inclined wall 38. This tends to hold the seal ring in position while the mating flange is brought into position. The same general relationship holds true with respect to corner 58 and the corresponding wall 38' of the mating flange. This tends to hold the two flanges and the seal ring in position as an assembled unit while the clamping ring is brought into place.

Proceeding further with the general dimensions and relationships of the seal ring 50, it will be seen that the width $W_1$ of the seal ring is preferably at least two hundredths of an inch (0.020") wider up to as much as five hundredths of an inch (0.050") wider than the total width W of the assembled recess portions 32 and 32'. That is, $W_1$ is normally approximately two to five hundredths of an inch greater in width than W (see FIG. 2). Additionally, the total radial width $W_R$ of the main body 52 is preferably only slightly less than the average radial width of the recess 32. Similarly, the body portion 54 which extends into the groove 44 is related thereto so as to have its inner radius $R_2$ substantially equal to the inner radius $R_i$ of the tube section 16. That is, $R_2$ is generally equal to the radius of the central circular openings 17 and 17'. The total axial width of section 54 is, however, only slightly greater than the total width $W_g$ of the gap or groove 45. With the relative dimensions as described, make-up of the joint results in engagement taking place between the axial side walls of the gasket and the bottom wall 42 and 42' of the recess before engagement of the groove walls 46 and 46' with the sides of the portion 54. As the make-up continues, a seal is first made between surfaces 42 and 42' and the gasket or seal ring 50. Thereafter, during the final make-up and before the surfaces 34 and 34' make metal-to-metal contact, a primary seal is generated between the walls 46 and 46' with the sides of the seal ring portion 54. Additionally, when the final make-up is achieved, the seal chamber 30 is substantially completely filled and the inner surfaces of the gasket portion 54 and the surfaces of the inner tubular sections are in alignment and there are no exposed recesses into which process fluid might collect.

Preferably, and as best shown in FIGS. 2 and 3, the corners of the recess 32 and the gasket 50 are provided with a radius in the range of 0.01 and 0.05". The radial innermost corners of both the recess and the gasket which mate at bore line of passages 17, 17' are not radiused, however. These corners are maintained sharp to reduce the possibility of forming fluid entrapment recesses or cavities at the bore line.

FIGS. 5 through 7 show a second embodiment of the invention. This embodiment provides a design which allows disassembly to be accomplished with less axial separation of the flange faces as compared with the FIGS. 1–4 embodiment. In the FIGS. 5 through 7 showing, the same reference numerals have been used to identify those components which correspond to those previously described with reference to FIGS. 1 through 4. Those items which differ, however, have been given new reference numerals. Referring particularly to FIG. 5, it will be seen that the primary difference between the FIGS. 1 through 4 and the FIGS. 5 through 7 embodiments is in the fact that tube section 12 has been replaced by a modified tube section 70. The tube section 70 has a radially extending flange 72 of a diameter and exterior shape to correspond to the diameter of the flange 18 on section 16. Flange 72, however, does not have a recess of the nature of recess 32. Rather, it has a shallow counterbore 74 which extends inwardly of the seal face a distance corresponding to the distance to the groove face 46. Thus, the resulting groove 45 has the same width and dimensions as previously discussed in the FIGS. 1 through 4 embodiment.

The shallow counterbore 74 allows for engagement with the modified seal ring member 76 and assures alignment between the sections 14 and 70 during make-up of the flange joint construction. The seal ring 76 is basically the same as the previously discussed seal ring 50, but that portion of the seal ring 50 which entered into the recess 32' of tube section 16' has been removed. The main body portion 78 of the seal ring 76 thus has a width which is slightly greater than one-half W plus one-half $W_g$ of the FIGS. 1 through 4 embodiment. The radially inward portion 80, however, is of the same size as previously discussed portion 54. The radial dimensions preferably correspond to those previously discussed with the reference to the FIGS. 1 through 4 embodiment.

FIGS. 8 and 9 show modified gasket constructions for the FIGS. 1–4 embodiment. These embodiments are designed to reduce the possibility of gasket material extruding or bulging beyond the bore line and into the passageway 17, 17' if the gasket is subject to a significant temperature increase.

In the FIGS. 8 and 9 embodiments, the overall external dimensions of the gaskets are the same as shown and discussed with respect to gasket 50 of FIG. 3. That is, the overall dimensions of the gaskets and their relationship to the recess 36 remain the same. The difference, however, is that in the gaskets 50' and 50" of FIGS. 8 and 9, respectively, there are circumferentially continuous metal ring inserts located to extend into the respective portions 54' and 54". In the FIG. 8 embodiment, the ring 90 is a flat metal ring sized and positioned to extend from the outer periphery to a point closely adjacent the inner periphery. It is preferably molded in the main elastomer body at the radial midplane so that a relatively thin covering of elastomer encloses the ring in the area of gasket portion 54'.

The embodiment of FIG. 9 is basically the same as the FIG. 8 embodiment but the ring 92 is tapered to be thinner at the outer periphery. Thus, the thickness of the elastomer covering the ring in portion 54" increases in the radial outward direction. As a result, when the elastomeric of the gasket is heated and expands, the material tends to move radially outward rather than extruding radially inward.

The use of the metal rings in the FIGS. 8 and 9 embodiments reduces the total volume of resilient elastomeric material in the gaskets without reducing the strength of the gaskets. The reduction in elastomeric material acts to reduce the likelihood of seal material extrusion into bore opening 17, 17'. Thus, the advantages of the bore line sealing of the design are more readily retained.

FIGS. 10 through 12 show the preferred form for the clamp ring assembly useful in the FIGS. 1 through 9 embodiment. This clamp ring assembly is designed for manual actuation to apply the necessary axial clamping loads to the clamped flange assembly and to allow rapid makeup and disassembly of the fitting. Additionally, the clamp ring is arranged so as to allow the assembler to have a proper manual feel when the clamping of the flange fitting is taking place. The assembly is also arranged to eliminate galling of mating metal components and to provide containment of any bearing materials and the like which could contaminate the surrounding environment. Particularly, the clamp assembly is designated generally with the numeral 100 and comprises three articulated sections 102, 104 and 106 which define together the main body of the clamp assembly 100. The individual body sections 102, 104, 106 are pivotally connected about parallel transverse axes by a pair of separate pivot pins 108 and 110. As illustrated, the sections 102 and 106 each have a bifurcated end portion which receives the ends of section 104 and through which the pivot pins 108 and 110 connect.

The interior surfaces of the sections 102, 104, 106 are provided with a V groove configuration best seen in FIG. 12. As illustrated therein, a V groove having spaced side walls located at an angle $\alpha_1$ as shown are arranged to engage about the outer surfaces of the flange portions of the tube bodies 16 and 16' in the manner shown in FIG. 1. In the preferred embodiment, the angle $\alpha_1$ is approximately 20°. The articulation of the body sections 102, 104, 106 allows the assembly to be opened up in the usual known manner for positioning about the flanges. The upper free ends of sections 102 and 106 as seen in FIGS. 10 and 11 are arranged so as to be driven together into a clamping relationship to force the flanges of the pipe sections 16 and 16' axially together to compress the seal member and to bring the faces 34 and 34' into engaged relationship and to assure that proper pressure has been applied to the gasket.

The means for applying the necessary connecting and clamping forces to the free ends of sections 102 and 106 comprise a clamp screw and wing nut assembly 114. The assembly 114 includes a threaded clamp screw element 116 which has a threaded first portion 118 and a terminal end portion 120 which is provided with a circular through opening 122. The terminal end portion 120 is received in the bifurcated free end 102a of body section 102 and is pivotally connected therein by a transverse pin 124. The threaded portion of the clamp screw 116 receives the wing nut component 126 and is sized so as to be received in the bifurcated end 106a of body component 106. The wing nut and clamp screw assembly 126 can be pivoted from an outer released position wherein it is out of the bifurcated end portion 106a to the position shown in FIG. 10.

The wing nut component 126 can best be understood by reference to FIG. 11. As shown therein, it comprises a main nut body 128 having a threaded central opening 130 which is received on the clamp screw 116.

Tightening of the nut 128 onto the clamp screw 116 acts to apply a clamping force to the free end 106a of body section 106. For this purpose, the nut 128 is provided with a nose component 132 having a smoothly contoured arcuate forward end 134 adapted to enter into a corresponding concave recess 106b formed in the end of body member 106. In the subject embodiment, the nose element 132 is mounted for free rotation relative to the nut member 128. As illustrated, the nose component 132 has a cylindrical sleeve which extends about the reduced diameter portion 136 of nut member 128. Preferably, the interior diameter of the sleeve portion of component 132 is closely and rotatably received on the reduced diameter portion 136 of nut member 128. Additionally, a resilient ring member formed of Teflon or the like 140 is received in an axially extending end groove 142 formed in the end of nut member 126. The ring 140 acts as a bearing and allows free relative rotation between the nose component 132 and the nut body 128. Thus, when the nut member is used to apply clamping force to the body section 106, it can rotate freely while the nose portion 132 is non-rotatably engaged within the contoured recess 106b. Consequently, there is no metal-to-metal rotary contact between the nose portion and the body section 106. Galling is eliminated and tightening of the wing nut 126 proceeds in a manner in which the bearing ring 140 is totally confined within the sleeve of the nose portion 132. Thus, even if fragments of the bearing material are generated during the tightening operation, they are confined and held and prevented from escaping to the surrounding environment.

The wing nut assembly further includes a lock nut member 148 which is carried within the open area 150 of the nut body 128. The lock nut 148 is received on the outer end of the threaded locking screw 116 and when tightened against the wing nut 128 locks it in its desired clamping position. The location of the lock nut 148 is such that it is readily accessible and can be moved to its lock position simultaneously with the movement of the clamp nut 128 to its clamp position. Preferably, an end cover plate 154 is positioned over the outer end of the clamp wing nut 128 and is held therein by suitable screws 156.

As can be seen from the foregoing, the clamp ring assembly provides an arrangement wherein galling between the wing nut assembly 126 and the clamp ring body components cannot take place. Additionally, the use of the confined bearing ring 140 assures that bearing materials will not escape to the surrounding environment.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

We claim:

1. A flange joint and seal ring assembly for joining and sealing pipe or tube ends that define an axial flow passage therethrough, comprising:
   a first and second annular flange, each of said flanges being at a respective one of the tube ends;
   each flange having an opposed end face with side walls, each end face cooperating to define an annular sealing chamber and a circumferentially continuous groove opening radially inward from said sealing chamber to said axial flow passage;
   a gasket comprising a main body and a radially inward second portion in theuncompressed state;
   said main body of said gasket being positioned within the sealing chamber; wherein said sealing chamber and said groove define an axis and are symmetrical about a plane perpendicular to said axis;
   said second portion of said gasket being positioned within said groove and compressed to form a substantially flush bore line seal contiguous with the interior surfaces of the tubes; and
   said main body of said gasket having an interference fit with one of said flange side walls so that said gasket is retained on one of said flanges during assembly of the joint.

2. The assembly of claim 1 wherein said main body of said gasket in an uncompressed state having an inner radius equal to or less than the inner radius of the sealing chamber wall forming an interference fit.

3. The assembly of claim 1 wherein said flanges have opposed rigid engagement faces whereby overcompression of said gasket is prevented.

4. The assembly of claim 1 wherein said gasket is resilient.

5. The assembly of claim 1 wherein said groove has planar side walls.

6. The assembly of claim 1 wherein said groove walls are tapered such that said groove narrows radially inward whereby an increased sealing pressure of said gasket adjacent the bore line occurs.

7. The assembly of claim 1 wherein said groove walls are tapered in the range of 1 to 10 degrees.

8. The assembly of claim 1 wherein said gasket is symmetrical about its radial axis.

9. The assembly of claim 1 wherein said sealing chamber and said groove are symmetrical about a radial midplane.

10. The assembly of claim 1 wherein said main body of said gasket is axially compressed when positioned in said sealing chamber.

11. The assembly of claim 1 wherein said second portion of said gasket has sharp corners and said groove has sharp corners adjacent said boreline wherein fluid entrapment is reduced.

12. The assembly of claim 1 wherein said main body of said gasket in an uncompressed state is rectangular in shape with radiused edges.

13. The assembly of claim 1 wherein said second portion of said gasket in an uncompressed state is rectangular in shape with sharp corners.

14. The assembly of claim 1 wherein a radial width of said main body of said gasket in an uncompressed state is substantially equal to the radial width of said sealing chamber.

15. The assembly of claim 1 wherein an axial width of said main body of said gasket in an uncompressed state is greater than the axial width of said sealing chamber.

16. The assembly of claim 1 wherein an axial width of said second portion of said gasket in an uncompressed state is greater than the axial width of said groove.

17. The assembly of claim 1 wherein said sealing chamber comprises inner and outer inclined side walls.

18. A flange joint and seal ring assembly for joining and sealing pipe or tube ends that define an axial flow passage therethrough, comprising:
   a first and second annular flange, each of said flanges being at a respective one of the tube ends;
   each flange having opposed end faces with side walls cooperating to define an annular recess comprising a seal chamber and a circumferentially continuous groove opening radially inward from said seal chamber to said axial flow passage;
   a gasket comprising a main body and a radially inward second portion in the uncompressed state;
   said gasket further comprising a rigid ring positioned within said second portion of said gasket so that said ring is isolated from said flow passage and being contained within said recess;
   said main body of said gasket being positioned within the seal chamber; and
   said second portion of said gasket being positioned within said groove and compressed to form a substantially flush bore line seal contiguous with the interior surfaces of the tubes.

19. The assembly of claim 18 wherein said gasket is resilient.

20. The assembly of claim 18 wherein said main body of said gasket in an uncompressed state has an inner radius equal to or less than the inner radius of the sealing chamber wall forming an interference fit occurs.

21. The assembly of claim 18 wherein said rigid ring is metal.

22. The assembly of claim 18 wherein said rigid ring extends into said second portion of said gasket.

23. The assembly of claim 18 wherein said rigid ring is tapered radially outward.

24. The assembly of claim 18 wherein said rigid ring is located in a radial midplane of said gasket.

25. A gasket for insertion into an annular recess of a flange joint assembly for joining axially aligned tube ends, the recess further comprising a seal chamber and a radially inward groove that is open to an interior flow passage of said tubes, the gasket comprising:

a main body that seals said seal chamber and a second portion that extends from said main body into said groove and being compressed within said groove forming a flush boreline seal contiguous with the interior surfaces of said tubes; and said gasket comprising a rigid ring positioned within the interior of said second portion of said gasket so that said ring is isolated from said flow passage and being contained within said annular recess.

26. The gasket of claim 25 wherein said rigid ring is encapsulated within said gasket.

27. The gasket of claim 25 wherein said rigid ring is positioned within said main body and said second portion.

* * * * *

UNITED STATES PATENT AND TRADEMARK OFFICE
CERTIFICATE OF CORRECTION

PATENT NO. : 6,234,545 B1
DATED : May 22, 2001
INVENTOR(S) : Babuder, et al.

It is certified that error appears in the above-identified patent and that said Letters Patent is hereby corrected as shown below:

Title page,
Item [63], entitled Related U.S. Application Data, please delete "08/893,974" and insert -- 08/893,975 --, and delete "July 16, 1998" and insert -- July 16, 1997 --.

Signed and Sealed this

Sixteenth Day of October, 2001

Attest:

NICHOLAS P. GODICI
Attesting Officer
Acting Director of the United States Patent and Trademark Office